(12) United States Patent
Yoon (10) Patent No.: US 12,513,075 B2
(45) Date of Patent: Dec. 30, 2025

(54) COMMUNICATION DEVICE SUPPORTING IP-BASED RAPIEnet AND NETWORK SYSTEM COMPRISING SAME

(71) Applicant: LS ELECTRIC CO., LTD., Anyang-si (KR)

(72) Inventor: Geon Yoon, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 15 days.

(21) Appl. No.: 18/689,736

(22) PCT Filed: Oct. 17, 2022

(86) PCT No.: PCT/KR2022/015771
§ 371 (c)(1),
(2) Date: Mar. 6, 2024

(87) PCT Pub. No.: WO2023/120914
PCT Pub. Date: Jun. 29, 2023

(65) Prior Publication Data
US 2024/0414078 A1    Dec. 12, 2024

(30) Foreign Application Priority Data
Dec. 24, 2021    (KR) .................. 10-2021-0186922

(51) Int. Cl.
*H04L 45/02*    (2022.01)
(52) U.S. Cl.
CPC .................................. *H04L 45/04* (2013.01)
(58) Field of Classification Search
CPC ....................................................... H04L 45/04
See application file for complete search history.

(56) References Cited

U.S. PATENT DOCUMENTS

| | | | |
|---|---|---|---|
| 2014/0095704 A1* | 4/2014 | Kiessling | G05B 19/41855 709/224 |
| 2014/0211657 A1* | 7/2014 | Balasubramanian | H04L 41/0803 370/254 |

(Continued)

FOREIGN PATENT DOCUMENTS

| | | |
|---|---|---|
| JP | 07049823 A | 2/1995 |
| JP | 2013528340 A | 7/2013 |

(Continued)

OTHER PUBLICATIONS

Yoon et al.; "RAPIEnet based Redundancy Control System"; 2011; 2011 11th International Conference on Control, Automation and Systems (Year: 2011).*

(Continued)

*Primary Examiner* — Glenton B Burgess
*Assistant Examiner* — Jihad K Boustany
(74) *Attorney, Agent, or Firm* — K&L Gates LLP (57) ABSTRACT

A communication device according to an embodiment of the present disclosure comprises: a communicator; and a processor configured to: if a network composed of a first topology including a star topology or a line topology is included on a communication path connecting the communication device and the other communication device, configure data to be transmitted to the other communication device through a first interface for accessing a RAPIEnet (Real-time Automation Protocol for Industrial Ethernet)-based upper layer and an Internet Protocol (IP)-based lower layer, and transmit the data to the other communication device through the communicator using the communication path.

14 Claims, 8 Drawing Sheets

(56) References Cited

U.S. PATENT DOCUMENTS

2016/0057010 A1\* 2/2016 López Morillo ....... H04L 45/50
398/49
2019/0245774 A1\* 8/2019 Shimokawa .......... H04W 40/12

FOREIGN PATENT DOCUMENTS

| JP | 2014011604 A | 1/2014 |
|----|-------------|--------|
| KR | 20160143437 A | 12/2016 |
| KR | 20170095374 A | 8/2017 |
| KR | 102102113 B1 | 4/2020 |
| WO | 2010116488 A1 | 10/2010 |

OTHER PUBLICATIONS

International Search Report for related International Application No. PCT/KR2022/015771; action dated Jun. 29, 2023; (2 pages).
Written Opinion for related International Application No. PCT/KR2022/015771; action dated Jun. 29, 2023; (3 pages).
Lee, et al; "Real-time transmission properties of industrial switched Ethernet with cascade structure"; Journal of Control, Automation, and Systems Engineering; vol. 10, No. 8; Aug. 2004; (9 pages).
Office Action for related Japanese Application No. 2024-513956; action dated Mar. 11, 2025; (4 pages).

\* cited by examiner

COMMUNICATION DEVICE SUPPORTING IP-BASED RAPIEnet AND NETWORK SYSTEM COMPRISING SAME

CROSS-REFERENCE TO RELATED APPLICATION

This application is a National Stage of International Application No. PCT/KR2022/015771, filed on Oct. 17, 2022, which claims priority to and the benefit of Korean Patent Application No. 10-2021-0186922, filed on Dec. 24, 2021, the disclosures of which is incorporated herein by reference in its entirety.

FIELD

The present disclosure relates to a communication device supporting IP-based RAPIEnet and a network system including the same.

BACKGROUND

RAPIEnet (Real-time Automation Protocols for Industrial Ethernet), including IEC 61158-3 type 21, IEC 61158-4 type 21, IEC 61158-5 type 21, IEC 61158-6 type 21, and IEC 62439-7, refers to an Ethernet-based high-availability industrial network protocol that supports ring topology or line topology.

In order for RAPIEnet to perform functions such as optimal transmission path, automatic configuration of network shape, and automatic ring manager selection, each communication device manages network-wide information in a network information base (NIB, IEC 62439-7 4.5) based on a hop count.

The hop count can be calculated only when the frame for managing the network can be understood between communication devices, and in order to perform functions such as searching for an optimal transmission path without knowing how the network is connected, all communication devices on the network must be able to support RAPIEnet.

Because of these characteristics, a separate dedicated switch supporting RAPIEnet is required to configure a star or tree-shaped network topology using RAPIEnet. In the case of general-purpose Ethernet switches, it is impossible to expand or expand the network using general-purpose Ethernet switches because the RAPIEnet Data Link layer does not provide information on the negotiation process for network configuration.

On the other hand, according to various control requirements of industrial sites using RAPIEnet, there is an increasing need for functions that can support RAPIEnet even in star or tree-shaped network topologies using general-purpose Ethernet switches.

SUMMARY

An object of the present disclosure is to provide a communication device and a network system including the same that is capable of operating a RAPIEnet-based application even in a star or tree-shaped network topology using a general-purpose Ethernet switch.

An object of the present disclosure is to provide a communication device and a network system including the same that allows generic communication devices that cannot implement the RAPIEnet Data Link layer for RAPIEnet communication to transmit and receive data using the RAPIEnet application.

A communication device according to an embodiment of the present disclosure comprises: a communicator; and a processor configured to: if a network composed of a first topology including a star topology or a line topology is included on a communication path connecting the communication device and the other communication device, configure data to be transmitted to the other communication device through a first interface for accessing a RAPIEnet (Real-time Automation Protocol for Industrial Ethernet)-based upper layer and an Internet Protocol (IP)-based lower layer, and transmit the data to the other communication device through the communicator using the communication path.

The data may be first data, and the processor may be configured to: if the network composed of the first topology is not included on the communication path, select one of the first interface, or a second interface for accessing the RAPIEnet-based upper layer and the RAPIEnet-based lower layer, configure second data to be transmitted to the other communication device through the selected first interface or the second interface, and transmit the data to the other communication device through the communicator using the communication path.

The data may be first data, and the processor may be configured to: identify header information included in third data received from the other communication device, and if the header information includes header information about the first interface, receive the third data through the first interface.

The processor may be configured to configure the data to include header information about the first interface.

The header information may include Destination Address, Source Address, Destination SAP (Service Access Point), Source SAP, Extension Data area, and Group Data area.

A network system according to an embodiment of the present disclosure comprises: a plurality of communication devices including a first communication device and a second communication device, wherein the first communication device comprises: a first communicator; and a first processor configured to: if a network composed of a first topology including a star topology or a line topology is included on a communication path connecting the first communication device and the second communication device, configure data to be transmitted to the second communication device through a first interface for accessing a RAPIEnet (Real-time Automation Protocol for Industrial Ethernet)-based upper layer and an Internet Protocol (IP)-based lower layer, and transmit the data to the second communication device using the communication path through the first communicator, and the second communication device comprises: a second communicator; and a second processor configured to: identify header information included in the data received from the first communication device, and if the header information includes header information about the first interface, receive the data through the first interface.

The first processor may be configured to configure the data to include header information about the first interface.

The network system according to an embodiment of the present disclosure may further include at least one Ethernet switch on a communication path connecting the first communication device and the second communication device.

A communication device of a first communication method using a data link layer based on multiple Ethernet ports according to an embodiment of the present disclosure is capable of communicating with other communication device in a second communication method using a data link layer based on a single Ethernet port.

The first communication method and the second communication method may be connectionless communication methods.

The first communication method may be RAPIEnet communication, and the second communication method may be UDP/IP communication.

When the communication device communicates with the other communication device in the second communication method, the communication device may communicate using header information necessary for the second communication method.

When the communication device exists in a network of a ring topology or a line topology, and the other communication device exists in a network of a star topology or tree topology, the communication device may communicate with the other communication device in the second communication method.

When the communication device fails communication with the other communication device in the first communication method, the communication device may attempt communication in the second communication method.

The communication device may communicate with the other communication device in the first communication method or the second communication method selected by a user input.

According to an embodiment of the present disclosure, a network-based control system can be configured according to various field situations by allowing RAPIEnet-based applications to be used even in a network configured in a star or tree topology.

According to an embodiment of the present disclosure, generic communication devices that do not implement the RAPIEnet Data Link layer for RAPIEnet communication can also transmit and receive data using the RAPIEnet application, thereby providing flexibility in network configuration.

According to an embodiment of the present disclosure, since the RAPIEnet application can be used without modifying even in a network constituting a topology that may not perform existing RAPIEnet communication, which is efficient and economical.

DETAILED DESCRIPTION

Hereinafter, preferred embodiments according to the present disclosure will be described in detail with reference to the accompanying drawings. The detailed description to be disclosed hereinafter with the accompanying drawings is intended to describe exemplary embodiments of the present disclosure and is not intended to represent the only embodiments in which the present disclosure may be implemented. In the drawings, parts unrelated to the description may be omitted for clarity of description of the present disclosure, and like reference numerals may designate like elements throughout the specification. In addition, in the embodiment of the present disclosure, terms including ordinal numbers such as first and second are used only for the purpose of distinguishing one component from another, and expressions in the singular include plural expressions unless the context clearly indicates otherwise.

Figure 1:
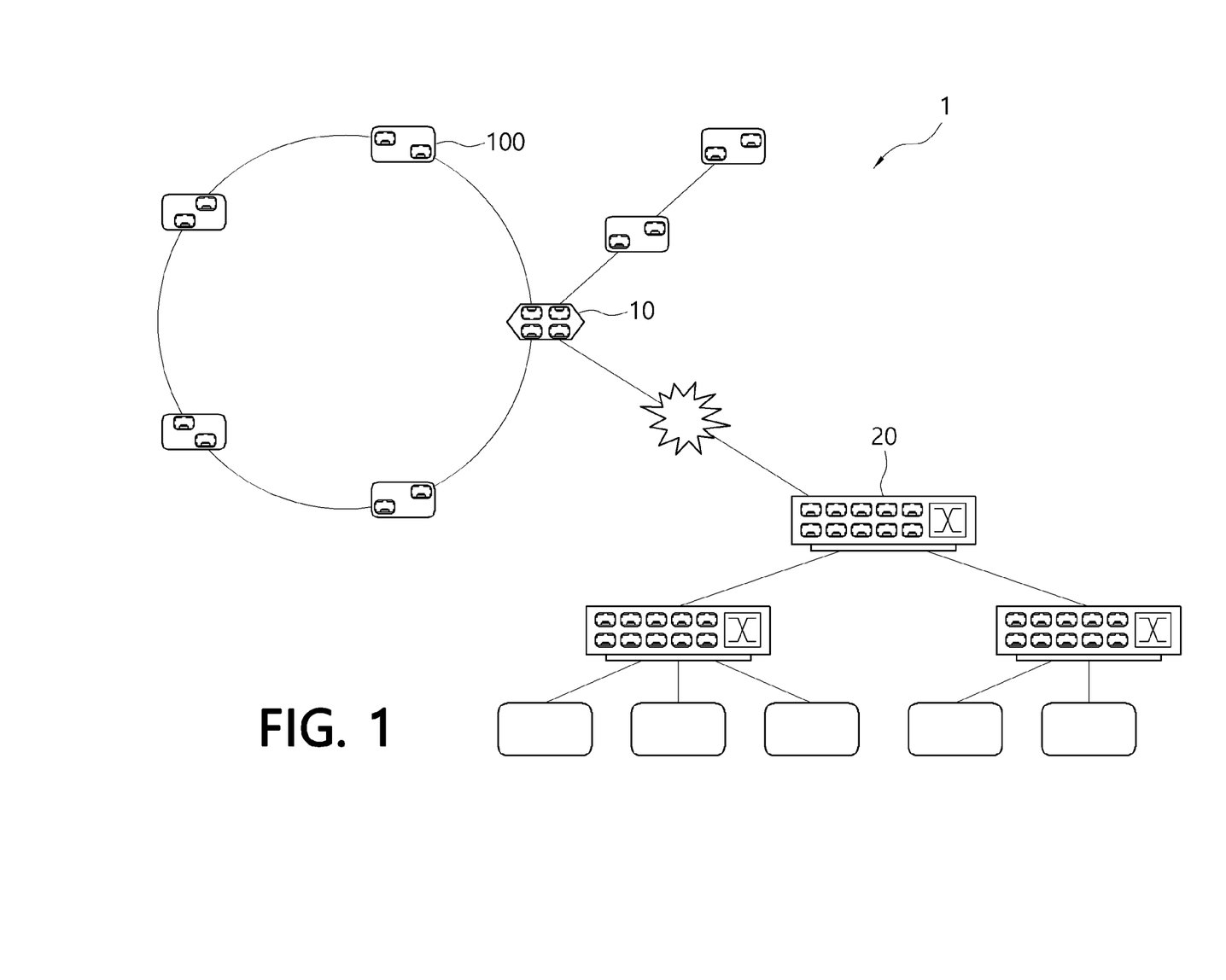
FIG. 1 is a diagram illustrating a network system composed of a plurality of communication devices supporting RAPIEnet.

FIG. 1 is a diagram illustrating a network system composed of a plurality of communication devices supporting RAPIEnet.

FIG. 1 is an example of a network system 1, in which a plurality of communication devices 100 form a network through a combination of ring topology, line topology, and tree topology, and shows a RAPIEnet ring switch 10 that connects a network in a ring topology and a network in a line topology, and a general-purpose Ethernet switch 20 that connects a network in a ring topology and a network in a tree topology.

In the case of RAPIEnet, which is configured using two physical layers, it can only be applied to networks of ring topology or line topology. Therefore, RAPIEnet communication may be performed using the RAPIEnet ring switch 10 supporting the RAPIEnet protocol in a control field in which a network may be configured only with a star topology or a tree topology (hereinafter referred to as a first topology). However, in the case of the ring switch 10, it is not suitable for configuring multiple topologies through ring switches 10 due to the limitation of the number of ports that can be accommodated, and the ring switch 10 itself is expensive, making it difficult to apply.

In the case of RAPIEnet, which is currently applied to the industrial domain, it is configured to exclude the UDP/IP layer and communicate directly from the RAPIEnet Data Link layer to the application layer so that timing is fast and real-time scheduling is possible according to industrial control. Therefore, the general-purpose Ethernet switch 20, which understands the UDP/IP frame but does not understand the RAPIEnet protocol, cannot be used.

As shown in FIG. 1, the general-purpose Ethernet switch 20 connected to the ring switch 10 does not understand the RAPIEnet protocol, so communication devices configured in a tree topology may not communicate with communication devices configured in a ring or line topology.

Hereinafter, in the present disclosure, a communication device of a first communication method using a data link layer based on multiple Ethernet ports, capable of communicating with other communication devices in a second communication method using a data link layer based on a single Ethernet port will be described. In this case, the first communication method may be RAPIEnet communication, the second communication method may be UDP/IP communication, and the first communication method and the second communication method are connectionless communication methods.

That is, an disclosure is proposed that enables communication even at the UDP/IP layer in the RAPIEnet protocol stack. In this case, since RAPIEnet communication is possible through UDP/IP frames, a RAPIEnet network can be configured in the form of a star or tree using a cheap and easy-to-use general-purpose Ethernet switch.

Figure 2:
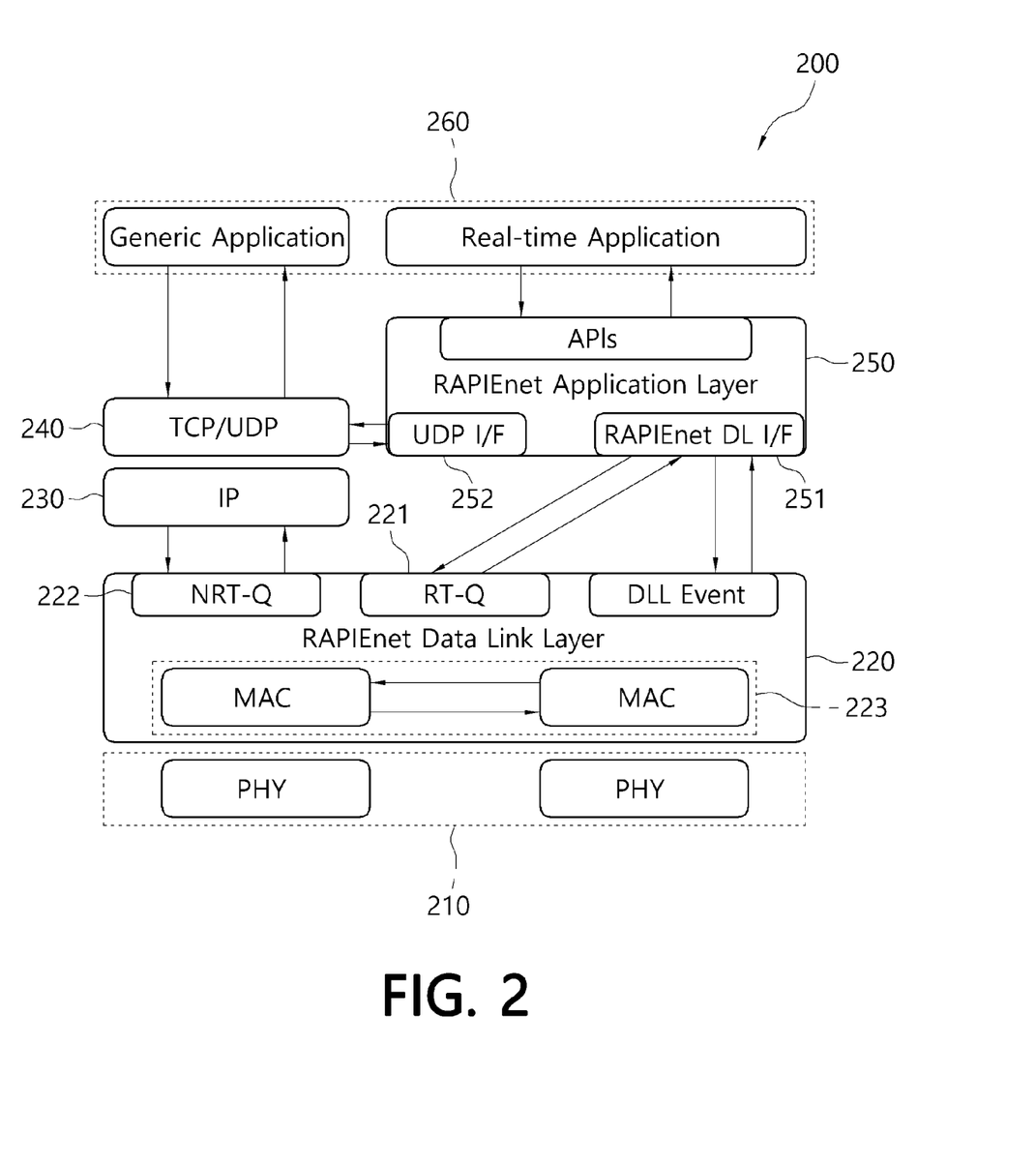
FIG. 2 is a diagram illustrating a RAPIEnet protocol stack according to an embodiment of the present disclosure.

FIG. 2 is a diagram illustrating a RAPIEnet protocol stack according to an embodiment of the present disclosure.

The protocol stack 200 shown in FIG. 2 represents a protocol transmission path when the operating application is a generic application, that is, a RAPIEnet application (real-time application).

More specifically, the protocol stack 200 includes a physical layer 210, a RAPIEnet Data Link layer 220, an IP layer 230, a TCP/UDP layer 240, a RAPIEnet Application layer 250, and an Application layer 260.

The physical layer 210 refers to a physical area that bits and transmits data such as frames or packets from one node to an adjacent node, and is an area defining a protocol related to network standards such as LAN, WAN, and MAN. A communication device supporting RAPIEnet has two ports.

The RAPIEnet Data Link layer 220 obtains and manages information on the optimal path and network shape configuration between communication devices by calculating a hop to each communication device through a negotiation process. In the case of general RAPIEnet communication, data is transmitted and received through a real time-queue (RT-Q) 221 having a high scheduling priority. According to an embodiment of the present disclosure, the RAPIEnet Data Link layer 220 may be a data link layer based on multiple Ethernet ports.

The IP layer 230 is a layer that determines which path to go through to send data to a desired communication device, similar to the RAPIEnet Data Link layer 220. At this time, it is shown that the IP layer 230 also goes through the RAPIEnet Data Link layer 220 in the protocol stack 200, but in the process of transmitting the data from the actual IP layer 230 to the physical layer 210 through the NRT-Q (Non Real Time-Q) 222, it is not modified and transmitted to the physical layer 210 as it is. That is, there is no interdependence between the IP layer 230 and the RAPIEnet Data Link layer 220. However, the IP layer 230 manages a table that determines which port in the physical layer 210 to transmit and receive data based on the address management system called the MAC address 223 of the RAPIEnet Data Link layer 220.

The TCP/UDP layer 240 is an area defining a method of transmitting data. When passing through the TCP layer, the connection between communication devices is established and maintained while data is transmitted and received in a connection-oriented manner, so reliability is guaranteed. When passing through the UDP layer, unlike TCP, since it does not go through the process of dividing and reassembling data into packets, the data transmission speed is fast, and when data is transmitted and received in a connectionless manner, it transmits and receives data unilaterally without going through a signal processing procedure to transmit or receive data.

In this case, the message communication method of RAPIEnet uses a connectionless protocol rather than a connection-oriented protocol. Therefore, in the present disclosure, UDP, a connectionless protocol type, is used to access the IP layer. Through this, since the UDP header is attached to the data for using the RAPIEnet application, a network of the first topology may be configured using a general-purpose Ethernet switch.

The RAPIEnet Application layer 250 is a data transmission layer similar to the TCP/UDP layer 240, and the RAPIEnet Application layer 250 has a RAPIEnet DL interface (RAPIEnet DL I/F) 251 and a UDP interface (UDP I/F) 252 to access the upper and lower layers. The RAPIEnet Application layer 250 may select one of the two interfaces to transmit and receive data.

Therefore, in the present disclosure, the communication path of the RAPIEnet application may implement two paths. One is a general RAPIEnet communication method, and is a path that transmits data to the RAPIEnet Data Link layer 220 through the RAPIEnet DL interface 251 or receives data entering the RAPIEnet Data Link layer 220 through the RAPIEnet DL interface 251. The other is a transmission path to the IP layer 230 to be implemented in the present disclosure, through the UDP interface 252 to communicate with the IP layer 230.

When communication fails by first attempting communication with another communication device in the first communication method, which is RAPIEnet communication, the communication device 100 according to an embodiment of the present disclosure may attempt communication in the second communication method, which is UDP/IP communication. In addition, it is not limited to this, and it is possible to communicate with other communication devices in the first communication method or the second communication method selected by user input.

In this case, the reason why the UDP interface 252 is used rather than the TCP interface is that the RAPIEnet uses a connectionless protocol as described above in the TCP/UDP layer 240.

When the data passes through the UDP interface 252 of the RAPIEnet Application layer 250, the data includes header information about the UDP interface. Thus, the TCP/UDP layer 240 may identify the RAPIEnet Application data.

According to an embodiment of the present disclosure, when the communication device 100 performs communication with another communication device through the second communication method, that is, UDP/IP communication, communication is performed using header information necessary for the second communication method. That is, header information about the UDP interface may be attached to RAPIEnet-based data to communicate with each other. Details of header information about the UDP interface will be described with reference to FIG. 4.

The Application layer 260 is a layer defining a service for transmitting or receiving data between transmission and reception sides, and includes a generic application and a RAPIEnet application.

RAPIEnet applications include, for example, data write/read functions in client/server models, data input/output functions in master/slave models, data sharing functions in producer/consumer models, remote OS download functions, and applications that perform various diagnostic functions.

While the RAPIEnet application is characterized by having to operate at a predictable time, in the case of a generic application, the viewpoint for the operation may not be predicted. Therefore, the RAPIEnet application is used when real-time control operation of the application is required, as in the automobile production work site due to the sequential movement of the conveyor belt.

According to an embodiment of the present disclosure, the RAPIEnet application of the Application layer 260 may communicate via the RAPIEnet Data Link layer 220 through the RAPIEnet DL interface 251 of the RAPIEnet Application layer 250, and communicate via UDP/IP through the UDP interface 252.

As such, a general-purpose Ethernet switch may understand the UDP protocol, so a RAPIEnet network of a tree or star topology may be configured using a general-purpose Ethernet switch.

Figure 3:
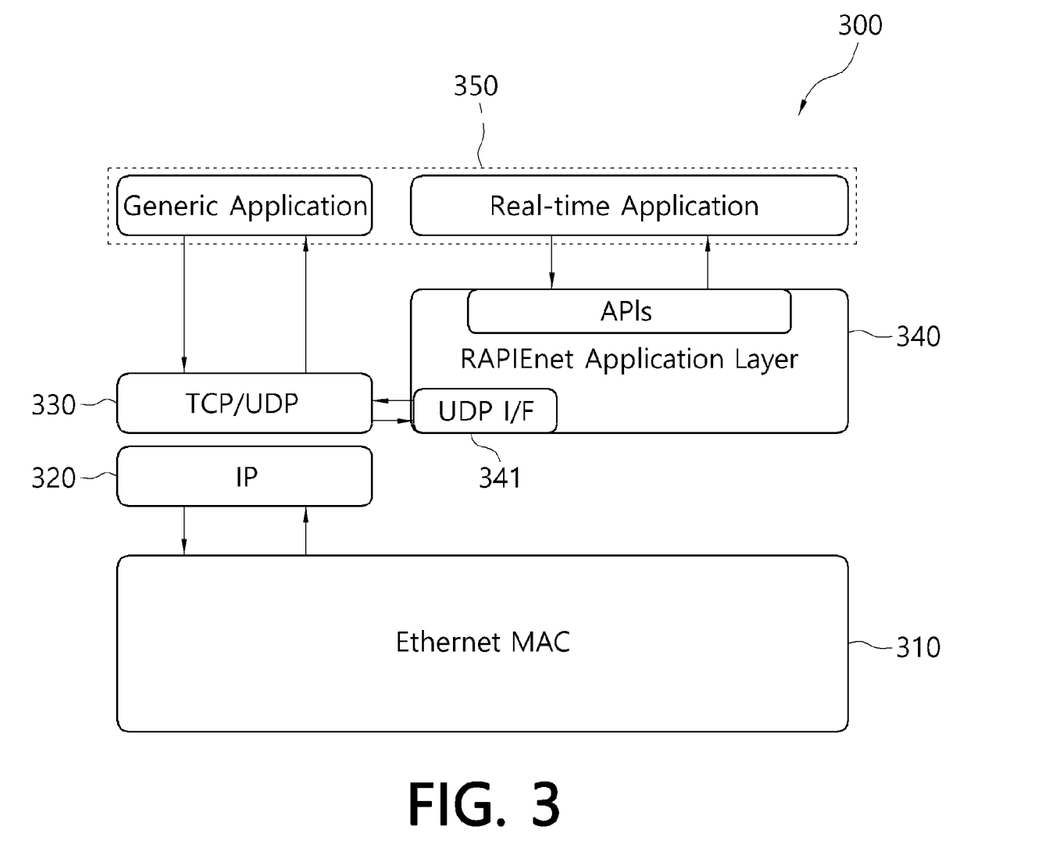
FIG. 3 is a diagram illustrating a RAPIEnet protocol stack according to an embodiment of the present disclosure.

FIG. 3 is a diagram illustrating a RAPIEnet protocol stack according to an embodiment of the present disclosure.

Unlike the protocol stack 200 of FIG. 2, the protocol stack 300 shown in this drawing has removed the RAPIEnet Data Link layer 220. In addition to this, the IP layer 320, the TCP/UDP layer 330, and the Application layer 350 have the same role and function as the layers of the protocol stack 200 of FIG. 2, and thus will be understood with reference to them.

The protocol stack 300 of FIG. 3 may be applied to a communication device that does not implement the RAPIEnet Data Link layer 220. In order to implement the RAPIEnet Data Link layer 220, a hardware configuration to implement the functions of RT-Q 221 and NRT-Q 222 is required. However, communication devices that are difficult to implement this hardware configuration, such as embedded devices such as PCs and human machine interfaces (HMI), that can only perform conventional communication, do not implement the RAPIEnet Data Link layer 220. Even in this case, as described above with respect to FIG. 2, since the IP layer 230 is not dependent on the RAPIEnet Data Link layer 220 and determines the data transmission path using the MAC address 223, the protocol stack 300 of FIG. 3 from which the RAPIEnet Data Link layer 220 is removed can be applied.

That is, even if the RAPIEnet Data Link layer 220 is not implemented, the generic communication device may communicate with the RAPIEnet application of the Application layer 350 via the UDP interface 341 of the RAPIEnet Application layer 340 through the Ethernet MAC 310, the IP layer 320, and the UDP layer 330.

According to an embodiment of the present disclosure, generic communication devices that do not implement the RAPIEnet Data Link layer 220 for RAPIEnet communication may also transmit and receive data using the RAPIEnet application through the UDP interface 341, thereby providing flexibility in network configuration.

Figure 4:
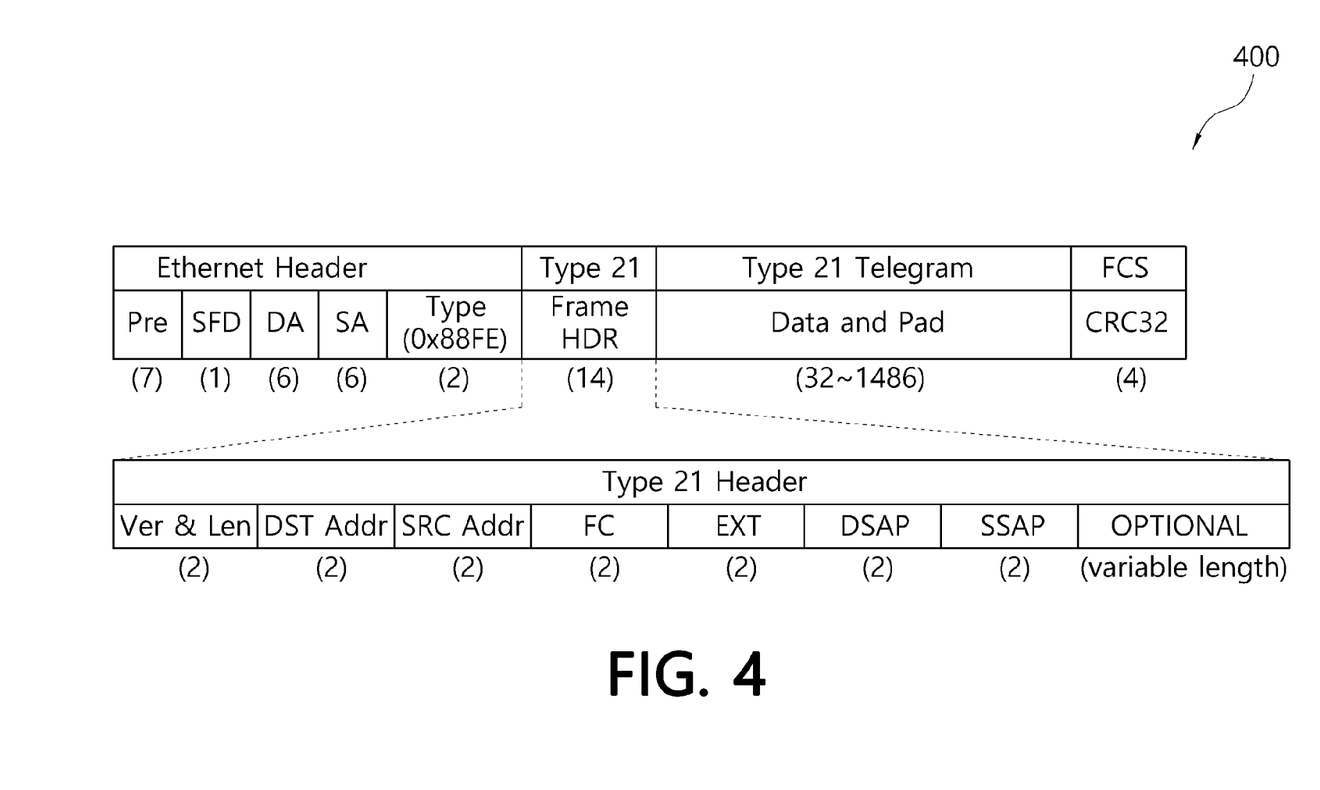
FIG. 4 is a diagram illustrating header information regarding a UDP interface according to an embodiment of the present disclosure.

FIG. 4 is a diagram illustrating header information 400 regarding a UDP interface according to an embodiment of the present disclosure.

The RAPIEnet application may select an effective communication method by utilizing various functions of the RAPIEnet Data Link layer. Since the RAPIEnet application utilizes various transmission functions of the RAPIEnet Data Link layer, header information must be added to the UDP interface.

The header information includes six items: 1) Destination Address (according to the RAPIEnet standard), 2) Source Address (according to the RAPIEnet standard), 3) Destination SAP (Service Access Point) (according to the RAPIEnet standard), 4) Source SAP (according to the RAPIEnet standard), 5) Extension Data area (according to the RAPIEnet standard), and 6) Group Data area (according to the RAPIEnet standard). Hereinafter, each item will be examined in detail with reference to Table 1 indicating values and explanations.

1) Destination Address (DST_addr)

This field represents the destination address of the node to which the frame is transmitted. In RAPIEnet, the destination address of the message can be set from 0x0000 to 0xFFFF as shown in [Table 1]. If the destination address is 0xFF, the destination MAC address field contains the ISO/IEC/IEEE 8802 3 MAC address.

2) Source Address (SRC_addr)

This field represents the source address of the node where the frame is created.

3) Destination SAP (Service Access Point)

This field represents the SAP of the DLE through which DLPDU is transmitted, and the range of allowable values is 0 to 65535.

4) Source SAP (Service Access Point)

This field represents the SAP of the DLE where DLPDU is generated, and the range of allowable values is 0 to 65535.

5) Extension Data Area

This field exists when the VoE bit in the frame control field is set to TRUE.

Group Mask Enable is a bit field that specifies whether the peer device will accept a frame when the frame is broadcast or multicast. If the value is set to TRUE, the Group Mask is activated in the peer device that receives the frame.

The Group Mask field uses a bit sequence to indicate message reception selection. When Group Mask Enable is set to TRUE, the Group Mask field is added in 4-octet increments (e.g., 4, 8, 12 to 32 octets). Each bit represents a reception selection of a frame for a corresponding DL entity identifier. 1 means TRUE for frame reception and 0 means FALSE. The first bit represents the frame reception option for the top DL entity identifier.

The extension type field represents the type of the extension field. A value of 0x00 indicates an invalid extension type, other values are reserved for later use.

The extension length field represents the length of the extension field. When Group Mask Enable is set to TRUE and the extension type is set to 0x00, the extension length specifies the length of the Group Mask field. When Group Mask Enable is set to FALSE and the extension type is set to a value other than 0x00, the extension length specifies the length of the extension field. When Group Mask Enable is set to TRUE and the extension type is not set to 0x00, the first two octets specify the length of the Group Mask field and the next two octets specify the extension type.

TABLE 1

| Field Name | Position | Value/Description |
|---|---|---|
| DST_addr | Bit 0-15 | 0xFF: broadcast address<br>0xFE: network control address (C_NCM_ADDR)<br>0xFD-0xDE: user-defined multicast address<br>0xDD: invalid address<br>0x0100 to 0xFFFF: reserved<br>0x00 to 0xDC: regular Type 21 DL-entity identifier |
| SRC_addr | Bit 0-15 | Source DL-entity identifier |
| DSAP | Bit 0-15 | Service access point of destination DLE |
| SSAP | Bit 0-15 | Service access point of source DLE |
| Extension Length | Bit 0-7 | 0 to 255: the length of extension field |
| Extension Type | Bit 8-14 | 0: Invalid extension type<br>1 to 127: reserved for future use |
| Group Mask Enable | Bit 15 | 0x0: Group mask is enabled<br>0x1: Group mask is disabled |

Figure 5:
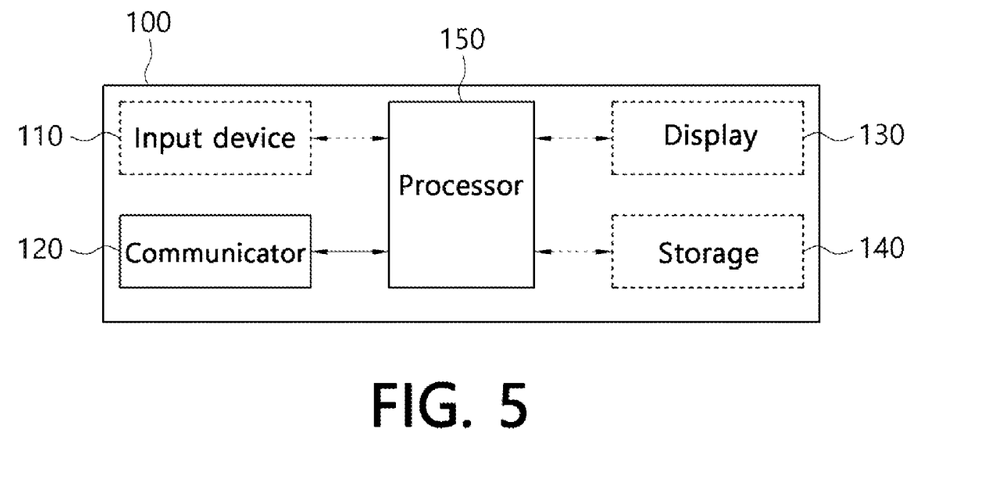
FIG. 5 is a block diagram illustrating a configuration of a communication device according to an embodiment of the present disclosure.

FIG. 5 is a block diagram illustrating a configuration of a communication device 100 according to an embodiment of the present disclosure.

The input device 110 includes at least one port connecting the communication device 100 to another communication device, the RAPIEnet ring switch 10, or the general-purpose Ethernet switch 20, or the like. In addition, the input device 110 includes at least one input means for generating input data in response to a user input. The input device 110 may include an input terminal, a button, a rotary switch, a keypad, a dome switch, a touch panel, a jog shuttle, a touch key, and the like.

The communicator 120 performs communication with external devices such as other communication devices and external servers (not shown). To this end, the communicator 120 may perform wireless communication such as 5th Generation communication (5G), Long Term Evolution-Advanced (LTE-A), Long Term Evolution (LTE), and Wireless Fidelity (Wi-Fi). The communicator 120 may use wireless communication such as RF (radio frequency), Zigbee, Bluetooth, Wi-Fi, UWB (Ultra Wide Band), and NFC (Near Field Communication) as a communication method. The communicator 120 may be implemented as a wireless communication module that performs wireless communication with an AP, such as Wi-Fi, or a wireless communication module that performs one-to-one direct wireless communication, such as Bluetooth.

The display 130 displays display data related to the operation of the communication device 100. The display 130 includes a liquid crystal display (LCD), a light emitting diode (LED) display, an organic light emitting diode (OLED) display, a micro electro mechanical systems (MEMS) display, and an electronic paper display. The display 130 may be combined with the input device 110 to be implemented as a touch screen.

The storage 140 stores operation programs of the communication device 100. The storage 140 includes a non-volatile storage for storing data regardless of whether power is supplied or not, and a volatile memory in which data to be processed by the processor 150 is loaded and cannot retain data unless power is provided. The storage includes a flash memory, a hard-disc drive (HDD), a solid-state drive (SSD), a read only memory (ROM), and the like, and the memory includes a buffer and a random access memory (RAM), and the like.

The processor 150 may execute software, such as a program, to control at least one other component (e.g., hardware or software component) of the communication device 100 connected to the processor 150, and may perform various data processing or calculations.

The processor 150 may configure data to be transmitted to another communication device through a UDP interface based on a network configuration on a communication path connecting the communication device 100 and the other communication device, and may perform an operation of transmitting data to another communication device using a communication path through the communicator 120.

The processor 150 may perform an operation of identifying header information included in data received from another communication device, and receiving data through the UDP interface when the identified header information includes header information about the UDP interface.

Figure 6:
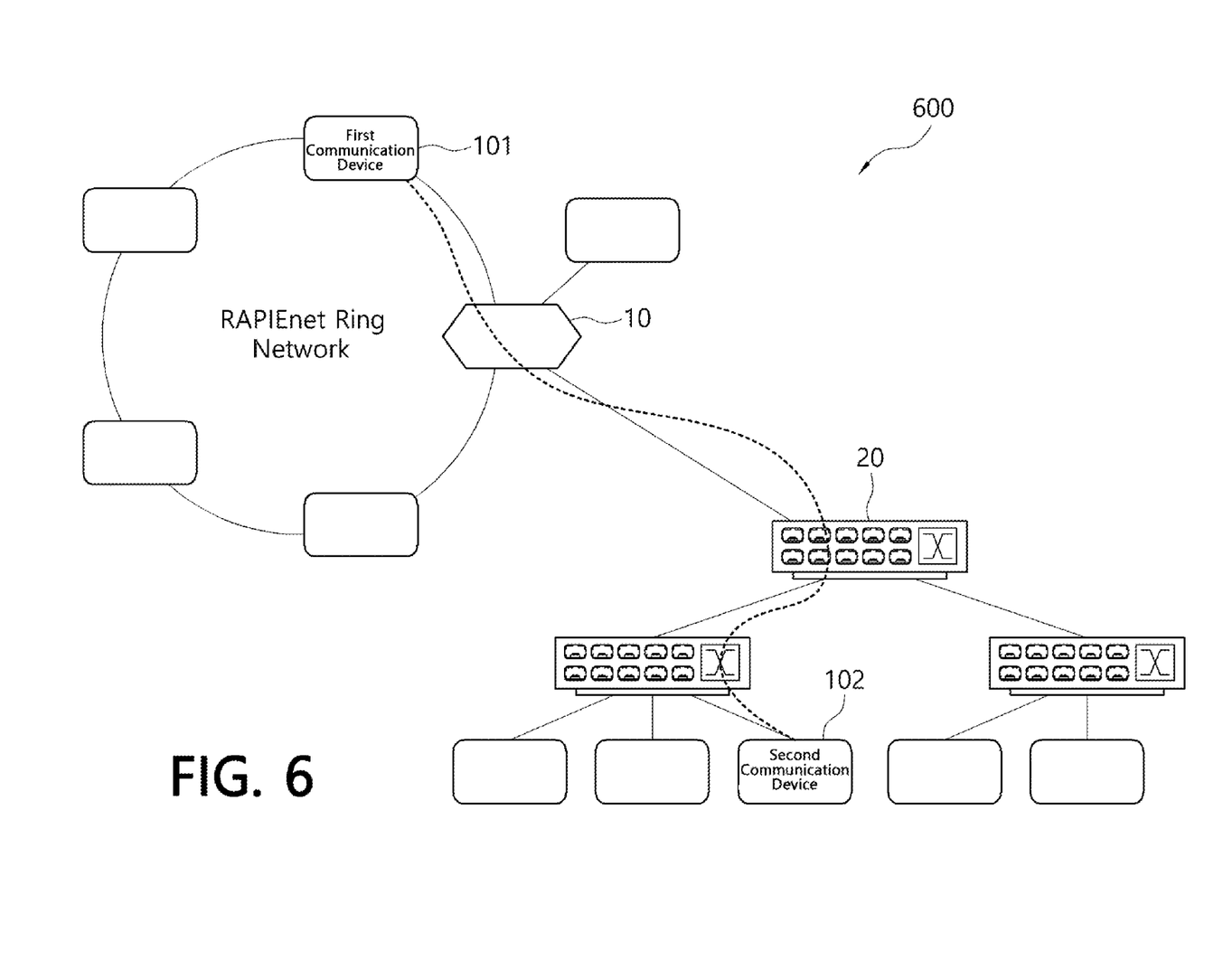
FIG. 6 is a diagram illustrating a network system composed of a plurality of communication devices supporting RAPIEnet according to an embodiment of the present disclosure.

FIG. 6 is a diagram illustrating a network system 600 composed of a plurality of communication devices supporting RAPIEnet according to an embodiment of the present disclosure.

The network system 600 according to an embodiment of the present disclosure is composed of a ring topology network and a tree topology network, and the two networks are connected by a ring switch 10 and a general-purpose Ethernet switch 20 connected to the ring switch 10. In the present embodiment, it is confirmed that communication between a first communication device 101 included in the ring topology network and a second communication device 102 included in the tree topology network is performed. The first communication device 101 and the second communication device 102 are one of the communication devices 100 described above with reference to the description of FIG. 5, and the configuration included in each communication device is understood with reference to the description of FIG. 5.

In FIG. 6, the first communication device 101 communicates using the protocol stack 200 of FIG. 2 as configuring a ring topology, which is one of the RAPIEnet networks. In the case of the second communication device 102, the protocol stack 200 of FIG. 2 may be used as a communication device supporting RAPIEnet, but the present disclosure is not limited thereto, and in the case of a communication device performing general IP communication, the protocol stack 300 of FIG. 3 may be used. That is, the second communication device 102 is a communication device constituting a tree topology network, and does not necessarily have to be a RAPIEnet communication device having two physical ports.

When a network configured with at least one topology of a star topology and a tree topology is included on a communication path connecting the first communication device 101 and the second communication device 102, the data must access the IP layer 230. That is, in order to transmit and receive data to and from a communication device on a star topology or tree topology, it must be through a general-purpose Ethernet switch, and the general-purpose Ethernet switch can understand the IP-based protocol, so it is necessary to modify the data transmission protocol for this.

The first processor 151 of the first communication device 101 may access a RAPIEnet-based upper layer to receive data entering the IP layer 230, and may use the UDP interface 252, which is a first interface capable of accessing an IP-based lower layer to transmit RAPIEnet-based data with an IP-based protocol. In this case, the UDP interface 252 may exist in the RAPIEnet Application layer 250. Referring to the protocol stack 200 of FIG. 2, the RAPIEnet-based upper layer means the RAPIEnet Application layer 250 and the Application layer 260, and the IP-based lower layer means the TCP/UDP layer 240 or less.

However, since the first communication device 101 communicates with other communication devices included in the RAPIEnet ring network, the RAPIEnet DL interface 251, which is the second interface for accessing the RAPIEnet-based upper layer and the RAPIEnet-based lower layer, may be used.

That is, the first processor 151 of the first communication device 101 may select one of the RAPIEnet DL interface 251 and the UDP interface 252 to transmit data in order to access a lower layer in the RAPIEnet Application layer 250 of the protocol stack 200.

The first processor of the first communication device 101 may configure data to be transmitted to the second communication device 102 through the UDP interface 252 based on a communication path with the second communication device 102. Alternatively, the first processor 150 of the first communication device 101 may determine whether a route through the UDP interface 252 should be selected by identifying the presence or absence of the general-purpose Ethernet switch 20 on the communication path. The data configured through the UDP interface 252 includes header information about the UDP interface described above with reference to FIG. 4.

The first processor 151 of the first communication device 101 may transmit RAPIEnet-based data including header information about the UDP interface 252 to the second communication device 102 along a communication path with the second communication device 102.

The second processor 152 of the second communication device 102 identifies header information included in data received from the first communication device 101. When the identified header information includes header information about the UDP interface 252, the second communication device 102 receives data through the UDP interface 252.

More specifically, when using the protocol stack 200 of FIG. 2, the second communication device 102 receives data using the UDP interface 252 of the RAPIEnet Application layer 250 via the IP layer 230 and TCP/UDP layer through the NRT-Q 222 of the RAPIEnet Data Link layer 220 and the TCP/UDP layer 240. If the second communication device 102 is a device that performs general IP communication, such as a PC or embedded device, as described above, it may communicate with the RAPIEnet application of the Application layer 350 through the UDP interface 341 of the RAPIEnet Application layer 340 through the MAC layer 310, the IP layer 320, and the UDP layer 330 using the protocol stack 300 of FIG. 3.

According to an embodiment of the present disclosure, since the RAPIEnet application may be used without modifying even in a network constituting a topology that may not perform existing RAPIEnet communication, resources required for application development are not required at all. In addition, even communication devices that do not support RAPIEnet communication can use the RAPIEnet application without having to modify the RAPIEnet application, which is economical.

Figure 7:
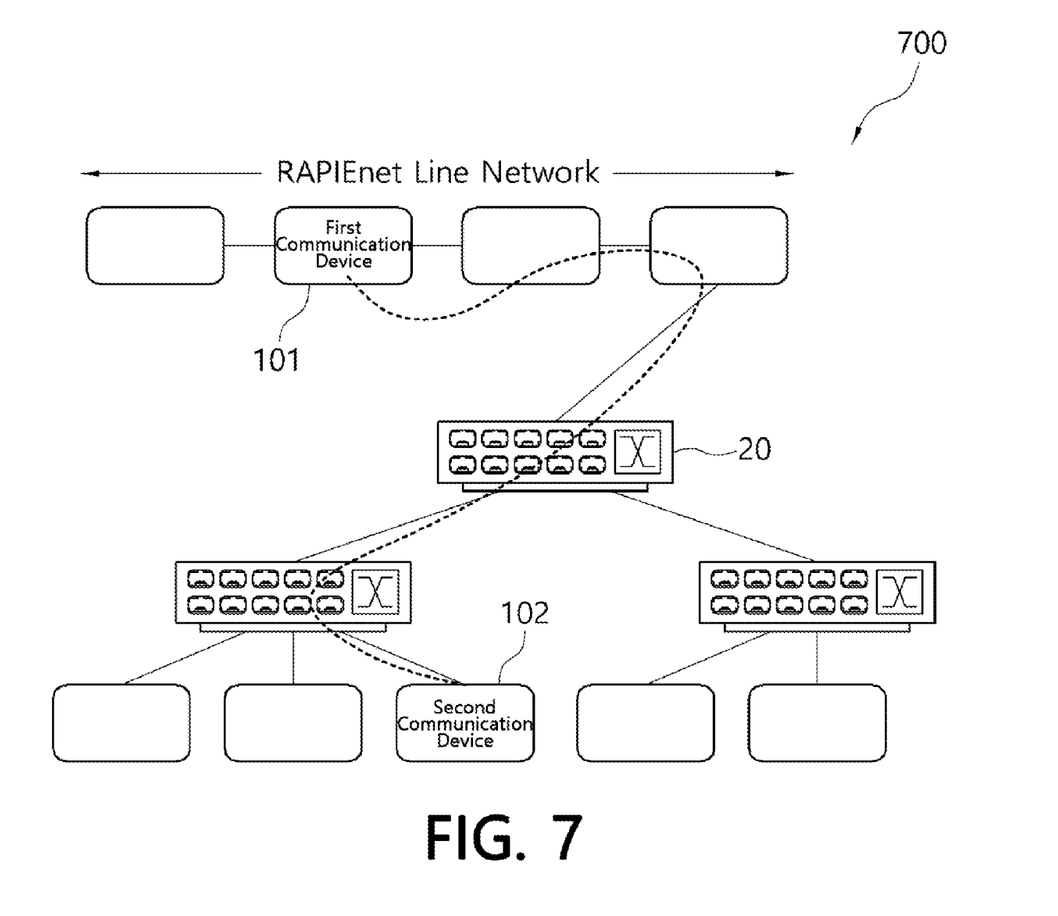
FIG. 7 is a diagram illustrating a network system composed of a plurality of communication devices supporting RAPIEnet according to another embodiment of the present disclosure.

FIG. 7 is a diagram illustrating a network system 700 composed of a plurality of communication devices supporting RAPIEnet according to another embodiment of the present disclosure.

The network system 700 according to an embodiment of the present disclosure is composed of a line topology network and a tree topology network, and the two networks are connected by a general-purpose Ethernet switch 20. In the present embodiment, it is confirmed that communication between a first communication device 101 included in the line topology network and a second communication device 102 included in the tree topology network is performed. The first communication device 101 and the second communication device 102 are one of the communication devices 100 described above with reference to the description of FIG. 5, and the configuration included in each communication device is understood with reference to the description of FIG. 5.

In FIG. 7, the first communication device 101 communicates using the protocol stack 200 of FIG. 2 as configuring a line topology, which is one of the RAPIEnet networks.

In the case of FIG. 7, the situation is the same except that there is only a difference in that the FIG. 6 and the network including the first communication device 101 is a line topology and a ring topology, respectively. Therefore, overlapping points are omitted and additional contents are mentioned. The same is true that the content may be supplemented and applied to the network system 600 of FIG. 6.

According to an embodiment of the present disclosure, four communication devices constituting a line topology set up a line network manager through a mutual negotiation process. In this case, the line network manager may be a communication device located at both ends of the four communication devices.

The line network manager allows communication devices to transmit and receive RAPIEnet-based data only within the line network. This is because when the RAPIEnet protocol is transmitted to a general-purpose Ethernet switch 20, the general-purpose Ethernet switch 20 does not understand it, so the switch may be broken or malfunctioned. Therefore, the line network manager only transmits data including IP-based protocols, that is, data including header information about UDP interfaces 252 and 341, to the general-purpose Ethernet switch 20.

In this case, the first communication device 101, which is the client side that starts data communication, may have information in advance on which interface to use for transmitting data among the RAPIEnet DL interface 251 and the UDP interface 252. This may exist in the form of a communication parameter on the client side, and may be set by a communication user (technician).

On the other hand, when the second communication device 102, which is a server-side communication device, responds to data requested by the client, since it is possible to distinguish which of the RAPIEnet DL interface 251 and the UDP interface 252 has received data based on the header information included in the received data, the corresponding interface may be responded using this information.

Figure 8:
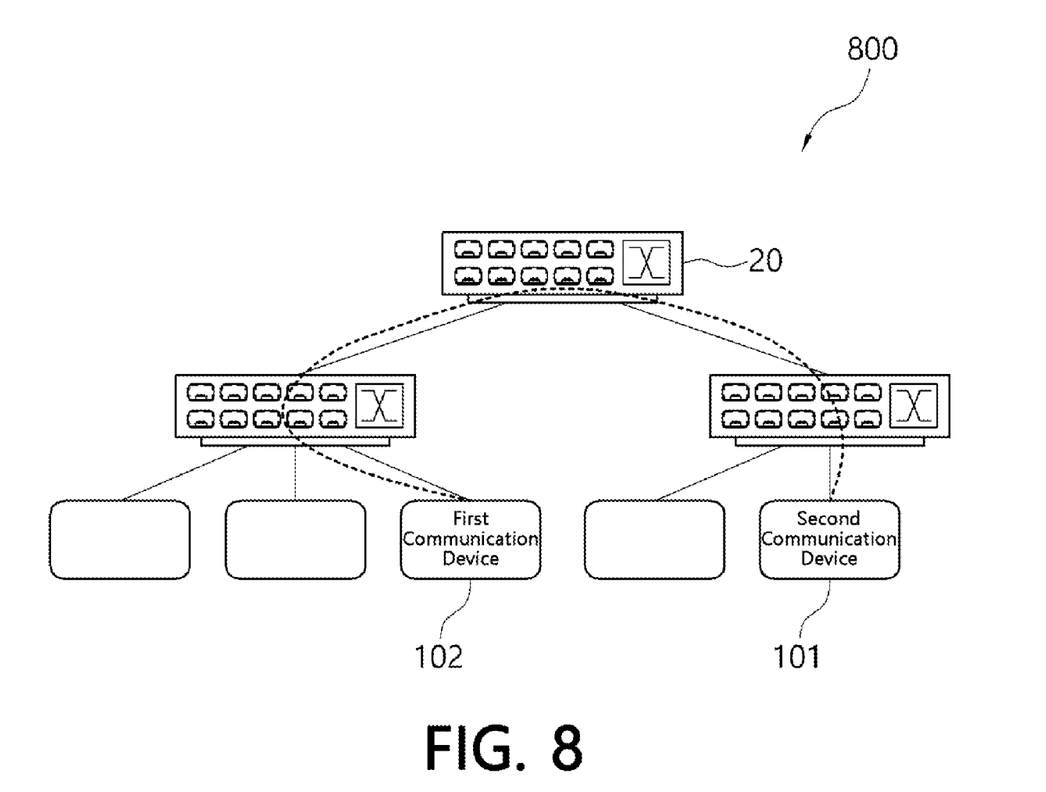
FIG. 8 is a diagram illustrating a network system composed of a plurality of communication devices supporting RAPIEnet according to yet another embodiment of the present disclosure.

FIG. 8 is a diagram illustrating a network system 800 composed of a plurality of communication devices supporting RAPIEnet according to yet another embodiment of the present disclosure.

The network system 800 according to an embodiment of the present disclosure is composed of a tree topology network, and communication devices are connected by a general-purpose Ethernet switch 20. In the present embodiment, it is confirmed that communication between a first communication device 101 and a second communication device 102 included in the tree topology network is performed. The first communication device 101 and the second communication device 102 are one of the communication devices 100 described above with reference to the description of FIG. 5, and the configuration included in each communication device is understood with reference to the description of FIG. 5.

In the present embodiment, in the case of the first communication device 101 and the second communication device 102, the protocol stack 200 of FIG. 2 may be used as a communication device supporting RAPIEnet, but the present disclosure is not limited thereto, and in the case of a communication device performing general IP communication, the protocol stack 300 of FIG. 3 may be used. That is, the first communication device 101 and the second communication device 102 are communication devices constituting a tree topology network, and do not necessarily have to be a RAPIEnet communication device having two physical ports.

The first processor 151 of the first communication device 101 identifies a communication path connecting the first communication device 101 and the second communication device 102 to communicate with the second communication device 102.

Since the first communication device 101 and the second communication device 102 communicate through the general-purpose Ethernet switch 20, data must access the IP layer 230.

The first processor 151 of the first communication device 101 may use the UDP interface 252, which is the first interface capable of accessing the RAPIEnet-based upper layer and accessing the IP-based lower layer. Alternatively, when the first communication device 101 is a device that performs general IP communication, such as a PC or an embedded device, it may access the RAPIEnet-based upper layer and the IP-based lower layer using the UDP interface 341 of the protocol stack 300 of FIG. 3.

The second processor 152 of the second communication device 102 identifies header information included in data received from the first communication device 101. When the identified header information includes header information about the UDP interface 252, the second communication device 102 receives data through the UDP interface 252. If the second communication device 102 is a device that performs general IP communication such as a PC or an embedded device, it may perform communication through the UDP interface 341 of the protocol stack 300 of FIG. 3.

According to an embodiment of the present disclosure, IP-based RAPIEnet communication is possible even between communication devices in which the RAPIEnet Application layer for RAPIEnet communication is not implemented.

What is claimed is:

1. A communication device, comprising:
a communicator; and
a processor configured to:
identify a presence of a first topology on a communication path connecting the communication device and other communication device, the first topology including a star topology or a tree topology;
configure data to be transmitted to the other communication device through a first interface after the presence of the first topology has been identified, the first interface being configured to access a RAPIEnet (Real-time Automation Protocol for Industrial Ethernet)-based upper layer and an Internet Protocol (IP)-based lower layer;
transmit the data to the other communication device through the first interface,
identify an absence of the first topology on the communication path, wherein the data is first data;
in response to identify the absence of the first topology, select one of the first interface or a second interface, the second interface being configured to access the RAPIEnet-based upper layer and a RAPIEnet-based lower layer;
configure second data to be transmitted to the other communication device through the selected one of the first interface or the second interface; and
transmit the second data to the other communication device through the selected one of the first or the second interface using the communication path.

2. The communication device of claim 1,
wherein the data is first data, and the processor is configured to:
identify header information included in third data received from the other communication device, and if the header information includes header information about the first interface, receive the third data through the first interface.

3. The communication device of claim 1,
wherein the processor is configured to: configure the data to include header information about the first interface.

4. The communication device of claim 3, wherein the header information includes Destination Address, Source Address, Destination SAP (Service Access Point), Source SAP, Extension Data area, and Group Data area.

5. A network system, comprising:
a plurality of communication devices including a first communication device and a second communication device, wherein the first communication device comprises:
a first communicator; and
a first processor configured to:
identify a presence of a first topology on a communication path connecting the first communication device and the second communication device, the first topology including a star topology or a tree topology;
configure data to be transmitted to the second communication device through a first interface after the presence of the first topology has been identified, the first interface being configured to access a RAPIEnet (Real-time Automation Protocol for Industrial Ethernet)-based upper layer and an Internet Protocol (IP)-based lower layer; and
transmit the data to the second communication device through the first interface,
identify an absence of the first topology on the communication path, wherein the data is first data;
in response to identify the absence of the first topology, select one of the first interface or a second interface, the second interface being configured to access the RAPIEnet-based upper layer and a RAPIEnet-based lower layer;
configure second data to be transmitted to the other communication device through the selected one of the first interface or the second interface; and
transmit the second data to the other communication device through the selected one of the first or the second interface using the communication path, and
the second communication device comprises:
a second communicator; and
a second processor configured to:
identify header information included in the second data received from the first communication device, and
if the header information includes header information about the first interface, receive the second data through the first interface.

6. The network system of claim 5, wherein the first processor is configured to: configure the data to include header information about the first interface.

7. The network system of claim 6, wherein the header information includes Destination Address, Source Address, Destination SAP (Service Access Point), Source SAP, Extension Data area, and Group Data area.

8. The network system of claim 5, further comprising: at least one Ethernet switch on a communication path connecting the first communication device and the other communication device.

9. A device of a first communication method using a data link layer based on multiple Ethernet ports, wherein the communication device is configured to communicate with other communication device in a second communication method using a data link layer based on a single Ethernet port wherein the first communication method is RAPIEnet communication, and the second communication method is UDP/IP communication; wherein the device is configured to:
identify a presence of a first topology on a communication path connecting the communication device and other communication device, the first topology including a star topology or a tree topology;
configure data to be transmitted to the other communication device through a first interface after the presence of the first topology has been identified, the first interface being configured to access a RAPIEnet (Real-time Automation Protocol for Industrial Ethernet)-based upper layer and an Internet Protocol (IP)-based lower layer: and transmit the data to the other communication device through the first interface, identify an absence of the first topology on the communication path, wherein the data is first data;

in response to identify the absence of the first topology, select one of the first interface or a second interface, the second interface being configured to access the RAPIEnet-based upper layer and a RAPIEnet-based lower layer;

configure second data to be transmitted to the other communication device through the selected one of the first interface or the second interface; and transmit the second data to the other communication device through the communicator using the communication path.

10. The communication device of claim 9, wherein the first communication method and the second communication method are connectionless communication methods.

11. The communication device of claim 9, wherein when the communication device communicates with the other communication device in the second communication method, the communication device communicates using header information necessary for the second communication method.

12. The communication device of claim 9, wherein when the communication device exists in a network of a ring topology or a line topology, and the other communication device exists in a network of a star topology or tree topology, the communication device communicates with the other communication device in the second communication method.

13. The communication device of claim 9, wherein when the communication device fails communication with the other communication device in the first communication method, the communication device attempts communication in the second communication method.

14. The communication device of claim 9, wherein the communication device communicates with the other communication device in the first communication method or the second communication method selected by a user input.

* * * * *